Nov. 4, 1969　　　　B. J. MILLER　　　　3,475,960
SENSING PROBE WITH METALLIC COATING

Filed May 9, 1968　　　　　　　　　　　　2 Sheets-Sheet 1

INVENTOR.
BERNARD J. MILLER
BY
Caesar, Rivise,
Bernstein & Cohen
ATTORNEYS.

Nov. 4, 1969 B. J. MILLER 3,475,960
SENSING PROBE WITH METALLIC COATING
Filed May 9, 1968 2 Sheets-Sheet 2

INVENTOR
BERNARD J. MILLER
BY
Caesar, Rivise,
Bernstein & Cohen
ATTORNEYS.

United States Patent Office 3,475,960
Patented Nov. 4, 1969

3,475,960
SENSING PROBE WITH METALLIC COATING
Bernard J. Miller, Andorra Road,
Lafayette Hills, Pa. 19444
Filed May 9, 1968, Ser. No. 728,029
Int. Cl. G01f 23/24
U.S. Cl. 73—304   3 Claims

ABSTRACT OF THE DISCLOSURE

A sensing probe with metallic coating for detecting the presence of moving liquid having at least some electrical conductivity, the sensing probe consisting of a tube of non-conductive material, such as glass, having deposited on its interior surface a layer of conductive silver.

---

This invention relates to a sensing probe with metallic coating which has as one of its principal objectives the ability to sense and measure the presence and height of liquid like water. In particular the sensing probe of the present invention has great use in boats and ships for protection of motors and to actuate bilge pumps.

It is known to provide water sensing devices in the hull or base of a ship in order to indicate the presence of bilge. However, these devices have generally not given a continuous indication of liquid level but have rather been operable either on an incremental basis or on a maximum level basis. For instance, several devices have been proposed whereby the rise of liquid level to a given point completes a circuit. However, the further rise of the liquid level will not be readily apparent until a predetermined high point is reached by the liquid level. Hence, such devices will not indicate any intermediate values of liquid level and thus the user is never certain as to when the next higher point level indication will be reached. Such devices are therefore described as incremental.

The maximum level devices are of a similar nature in that such devices do not come into operation until a predetermined level is reached. Such devices do not actually indicate the liquid level.

In addition to the foregoing, it has been found that many of the devices presently utilized for measuring bilge level are mechanical devices which utilize, for instance, a float. Thus, such devices are subject to the failings of mechanical devices, for instance, whenever the float operation is obstructed by foreign materials, which obstruction is a real possibility in open waters.

While it has been suggested that measuring devices be utilized which rely upon the principle of the increase of electrical condenser capacitance or increased current flow with the rise of liquid between the plates of an electrical capacitor, such devices do not appear to have come into practical usage. Such electrical capacitor sensing devices have not been commercialized, and it is believed that one reason for such failure of commercialization may lie in the troubles of electrolysis, fragility and extreme unpredictability. In particular, where the liquid being measured is the capacitive element, dangerous electrolysis can be experienced which will dissolve away propellers, shafts, rudders and even screw fasteners in the hull and possibly even the hull itself, if made of metal.

Also, it is necessary to include a liquid level sensing device into an overall assembly which will have a control function. For instance, it is the present practice aboard ships to turn on bilge pumps periodically. If no liquid emerges from the pump exhaust, it is assumed that no bilge has collected. However, this is not necessarily a correct assumption since the pump inlet pipe may have become clogged and therefore with the turning off of the bilge pump, the bilge will continue to collect from an intermediate level instead of from a low level had the pump been permitted to continue to operate until all of the bilge had been ejected from the hull.

Still another need for a control device has been recognized by the present applicant in connection with the raw water pumps. Should the raw water pump inlet line become clogged, the raw water pumps will continue to operate without drawing water and thus the ship engine could be damaged severely or totally. The present applicant has therefore recognized the need for a device which will indicate the absence of water as well as the presence of water and which will convey the same to an appropriate control device.

Many of the foregoing objects of the present invention were achieved in co-pending application Ser. No. 552,497 by the provision of a liquid sensing device which included a sensing probe, and a Venturi arrangement downstream of the probe to draw an auxiliary flow of liquid past the probe and through the tube to create turbulence adjacent the probe to assure good liquid contact with the probe and to promote a cleansing action on the probe.

In co-pending application Ser. No. 552,497 the sensing probe consisted of a metallic tube that was encapsulated in a plastic jacket. It has been determined that in many instances the plastic will contain air bubbles in spite of precautions that are taken to remove such air bubbles. It has been found that the air bubbles will tend to collect at the interface of the metal tube with the plastic, and in this way interfere with and distort the passage of electrical current.

It is therefore an object of the present invention to provide an improved sensing probe, the nature of which automatically eliminates the presence of any disruptive air bubbles.

Yet another object of the present invention is to provide a liquid level sensing and control device which may be used in boats and ships.

Another object of the present invention is to provide a liquid level sensing and control device which possesses a wide utility, simplicity and reliability that has not been obtained by devices currently in use.

Yet another object of the present invention is to provide a liquid level sensing and control device which does not have any moving parts, and which can be conveniently located as permitted by the physical layout of the general area.

Still another object of the present invention is to provide a liquid level sensing and control device which will give a continuous indication of liquid level.

Yet another object of the present invention is to provide a liquid level sensing and control device which will actuate at a predetermined liquid level an alarm system, such as a warning buzzer or a light.

Yet another object of the present invention is to provide a liquid level sensing and control device which is incorporated into an overall assembly having a control function, such as the turning on or the turning off of pumps.

Still another object of the present invention is to provide a liquid level sensing and control device which is explosion-proof and spark-proof and which does not make physical contact with the hull of a ship of a ship or boat.

The foregoing as well as other objects of the invention are achieved by providing a sensing probe with metallic coating which is comprised of a tube of non-conductive material, such as glass which acts as the di-electric in the capacitor-type detection unit, and wherein a layer of silver is deposited by well known evaporative techniques in a vacuum upon the interior surface of the glass tube.

There is also provided a silastic plug with a sealant in a well known manner for the open end of the tube, for protective purposes. There is also a source of power associated with an oscillator which has an output frequency that varies in accordance with the level of liquid in contact with the sensing probe that is associated with the oscillator. The conductive layer of the sensing probe effectively forms one terminal of a capacitor arrangement, with the tube material constituting the dielectric. The liquid whose level is being measured forms the second terminal of a capacitor with the dissolved solids and impurities therein providing sufficient conductivity.

The oscillator output is fed to two filters which effectively constitute resonant circuits that are held at a predetermined frequency. If the oscillator output freqeuncy is equal to the frequency of the filters there will be no current flow to a meter. However, if the oscillator's frequency does not match the predetermined frequency of the filter, there will be a current flow through a rectifier and hence there will be a reading on the meter. Relays may be associated with the meter in order to feed the meter output to a control circuit such as a bell, a light or a switch, the switch functioning to turn on or turn off pumps as the case may be. The meter may be removed a considerable distance from the sensing probe, and in this way the actual level of the bilge or feed to the raw water pumps may be visually and continuously determined on the dock of the ship or other convenient place.

Other objects and many of the attendant advantages of the present invention will be readily appreciated as the same becomes better understood by reference to the following detailed description when considered in connection with the accompanying drawings wherein.

Figure 1:
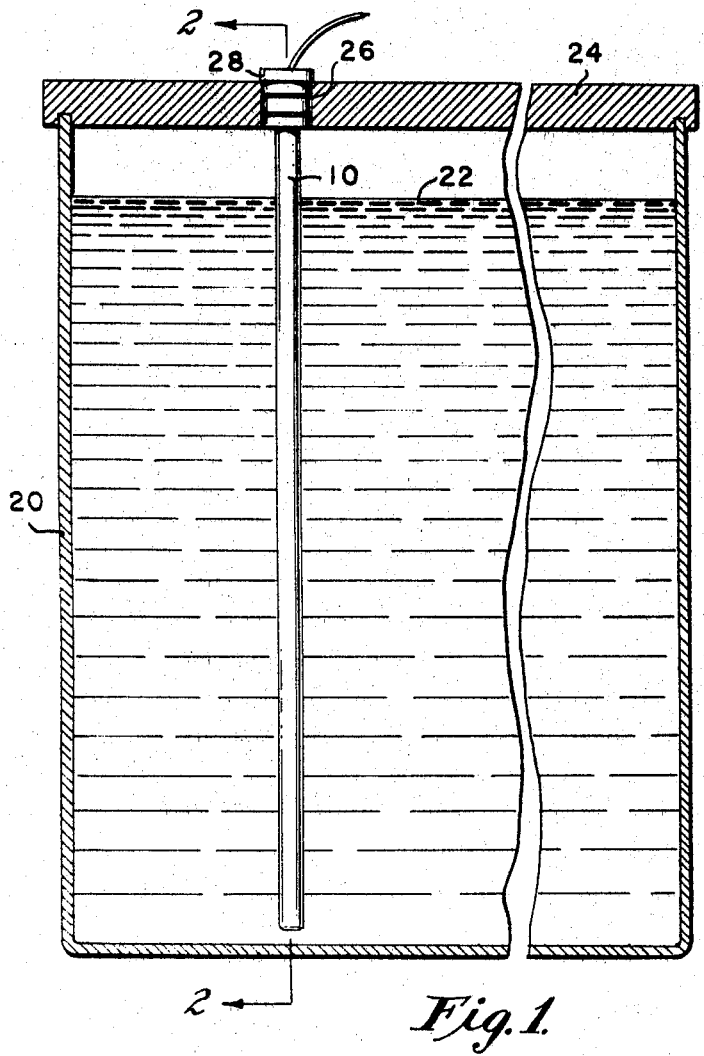
FIG. 1 is a view showing the sensing probe of the present invention in contact with a liquid whose level is being measured.

Referring now in greater detail to the various figures of the drawings wherein like reference characters refer to like parts, a view of a sensing probe 10 of the present invention installed for liquid level measurement purposes is shown in FIG. 1. The details of the sensing probe 10 appear from a consideration of FIGS. 2 and 3.

It is to be noted that while the sensing probe of the present invention is shown for purposes of measurement of liquid level, it is also easily adapted to sense the presence of a liquid in the manner as shown and described in co-pending application Ser. No. 552,497, the disclosure of which is hereby incorporated by reference. While the materials specified hereinafter are glass and silver, it will be readily appreciated that other dielectric and other electroconductive materials may be used, as will occur to those skilled in the art.

Figure 2:
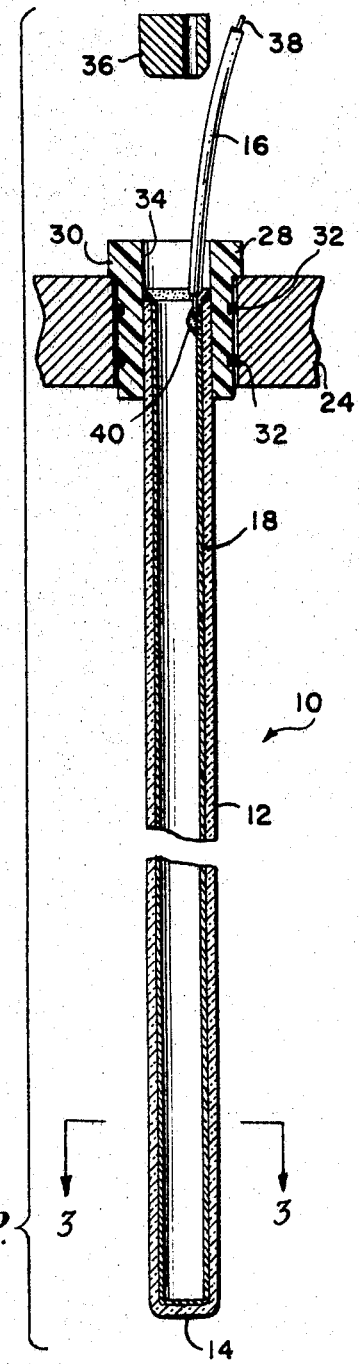
FIG. 2 is an enlarged fragmentary sectional view taken along the lines 2—2 of FIG. 1 and showing the silastic plug in exploded position away from the socket in which it is normally seated.
Figure 3:
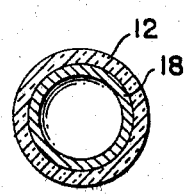
FIG. 3 is a sectional view taken along the lines 3—3 of FIG. 2.

Referring to FIG. 2 there can be seen a preferred embodiment of the invention. As shown in FIG. 2 the sensing probe includes a glass tube 12 having a closed end 14, and also having an open end which permits the entrance of insulated lead 16. The interior surface of the tube 12 has a silver coating 18 which preferably covers the entire interior surface. The silver coating 18 may be applied after the interior glass surface has first been cleaned with a nitric acid solution. Once this is done the silver coating is applied in a deposit by vacuum evaporation of an ammoniacal silver solution in a reduction mechanism.

It is to be understood that the invention is not necessarily limited to the application of silver in this way, although this is the preferred technique. In particular, the vacuum deposition of silver is achieved without the formation of air bubbles in the interface between the glass and the silver. It can be seen that the silver layer may be formed through a vacuum evaporation technique, or it can be chemically precipitated as well as being applied in other ways known to the art. While the probe of the present invention has been described in conjunction with an RF circuit, it is to be understood that other circuitry, such as a bridge set-up can be used.

As further shown in FIG. 1 the probe 10 is located in a tank 20 which alternatively may be the intake line of cooling water for a ship's engines, or may be the hull of a ship such that the probe 10 will detect the present of water 22.

For the sake of convenience and safety a protective cover 24 is provided having an opening 26 which permits the introduction of grommet 28, having upper flange 30 as shown in FIG. 2. The grommet 28 is fitted with sealing rings 32. As further shown in FIG. 2 the grommet 28 has an opening 34 which receives a flexible, sealing plug 36, with the plug 36 having an opening (not shown) to permit the passage of leads 16.

As further shown in FIG. 2 the conductive member 38 of lead 16 is soldered or secured by electrically conductive cement to the silver coating 18. The plug 36 may be permanently secured in opening 34 by an epoxy cement.

Figure 4:
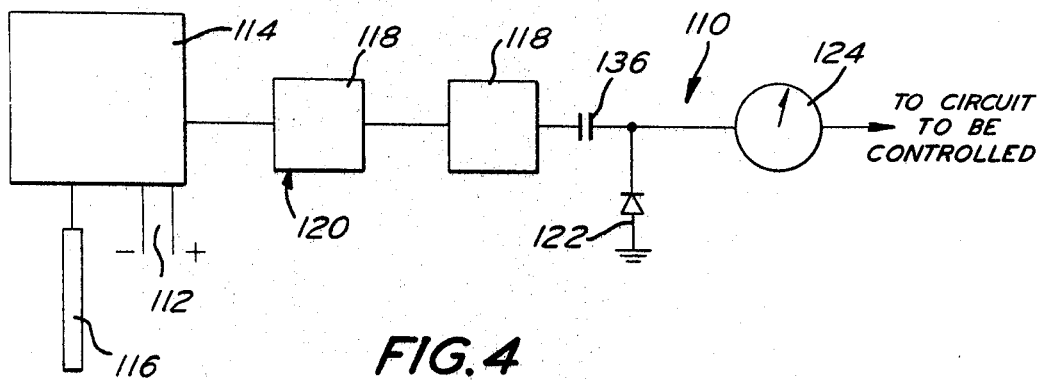
FIG. 4 is a circuit diagram showing the other components including an oscillator and a power source which are in the same circuit as the sensing probe of the present invention.

The circuit diagram of FIG. 4 shows the relationship between a probe 116 that is constructed in accordance with the present invention and a power source that is operative through an oscillator. With reference to FIG. 4, it can be seen that with the exception of the probe 116 being constructed in accordance with the present invention that the remainder of the cricuit 110 is as was disclosed in co-pending application Ser. No. 552,497, filed May 24, 1966, which is now U.S. Patent No. 3,392,581. It will be seen that the circuit 110 includes power source 112, oscillator 114, sensing probe 116, all of which together may constitute a sensing unit 120. When the sensing unit 120 is coupled with a diode 122 and meter 124, there is thereby constituted a fully operative liquid level sensing device. Where desired, a levelling capacitor 136 is inserted in the line between the second filter 118 and the diode 122, all in accordance with the disclosure of said co-pending application Ser. No. 552,497 which is now U.S. Patent No. 3,392,581.

It is thus seen that the present invention provides an effective means for detecting or measuring the presence of height of water.

While the invention has been described in terms of a glass tube, it is to be understood that the probe of the invention may take other forms, and for this reason the dielectric component may broadly be referred to as a member.

With the probe of the present invention the interfering effects of air bubbles are essentially completely eliminated. This makes for reliable operation for a theoretically unlimited period of time.

With the probe of the present invention, wherein the liquid being measured functions as one conductive plate in a capacitor arrangement, dangerous electrolysis is avoided, and in particular electrolysis which would dissolve away propellers, shafts, rudders, screw fasteners in the hull and even a metallic hull. The sensing probe of the present invention is sturdy and will endure rough treatment for unlimited periods of time to furnish reliable results.

Without further elaboration, the foregoing will so fully illustrate my invention, that others may, by applying current or future knowledge, readily adapt the same for use under various conditions of service.

What is claimed as the invention is:

1. A sensing probe for detecting a liquid in contact therewith, said liquid haivng at least some electrical conductivity, said sensing probe comprising a tube of nonconductive material with said tube having an external surface in contact with said liquid, said tube being closed at one end and open at the other end to define an internal tube surface which is not in contact with said liquid, a layer of conductive material deposited on said internal tube surface in an interface, said interface being substantially free of air bubbles, said tube open end being closed by a plug seated in said open end and held in place by a sealant, said plug having an opening permitting a conductor to pass from an external point to the interior of said tube, with said conductor being in secured electrical and mechanical contact with said conductive material, said conductor leading to said external point to a power source that is operative through an oscillator whereby said liquid and said conductive material act as conductive plates in a capacitor arrangement with the non-conductive tube material of said tube lying between said conductive material and said liquid, and said tube material functioning as the dielectric.

2. The invention of claim 1 wherein said conductive material is silver.

3. The invention of claim 1 wherein said non-conductive material is glass.

References Cited

UNITED STATES PATENTS

| | | | |
|---|---|---|---|
| 2,375,084 | 5/1945 | Coroniti et al. | 73—304 |
| 2,864,981 | 12/1958 | De Giers | 73—304 XR |
| 3,025,201 | 3/1962 | Ponemon. | |

DONALD O. WOODIEL, Primary Examiner

U.S. Cl. X.R.

73—301